United States Patent [19]

Bernstein

[11] Patent Number: 4,488,046
[45] Date of Patent: Dec. 11, 1984

[54] NUCLEAR RADIATION MEASURING APPARATUS AND METHOD

[76] Inventor: Karl Bernstein, 21651 Dumetz Rd., Woodland Hills, Calif. 91364

[21] Appl. No.: 375,792

[22] Filed: May 7, 1982

[51] Int. Cl.³ .............................................. G01N 5/00
[52] U.S. Cl. ................... 250/474.1; 250/485.1
[58] Field of Search ............ 250/252.1, 361 R, 363 R, 250/472.1, 474.1, 485.1

[56] References Cited

U.S. PATENT DOCUMENTS 2,763,786  9/1956  Mauer et al. ................... 250/474.1
2,966,589  12/1960  Liebson et al. ................. 250/485.1
2,972,051  2/1961  Baum ............................... 250/474.1
3,191,033  6/1965  Greer et al. ..................... 250/485.1
4,059,765  11/1977  Tatsuta et al. .................. 250/361 R Primary Examiner—Janice A. Howell
Attorney, Agent, or Firm—Nilsson, Robbins, Dalgarn, Berliner, Carson & Wurst

[57] ABSTRACT

A visually readable nuclear radiation measurement device functioning as a dose rate meter or a dosimeter. There are disclosed several embodiments allowing the user to match the brightness of a scintillating means to a reference light source thereby to ascertain the desired dose rate radiation information and allowing the user to match the brightness of light penetrating a dye type dosimeter to a reference light source to ascertain the total dose.

51 Claims, 18 Drawing Figures

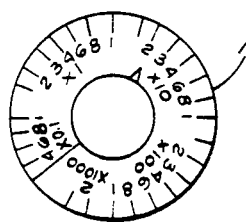
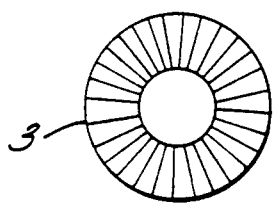
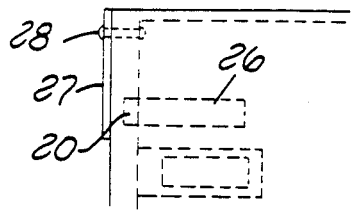
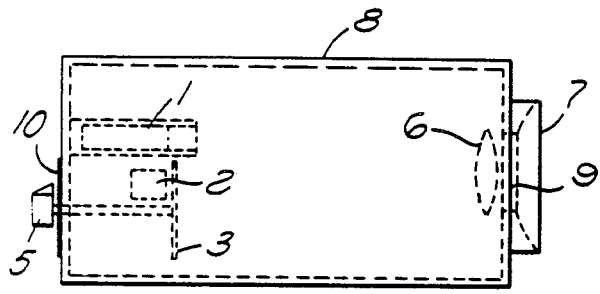
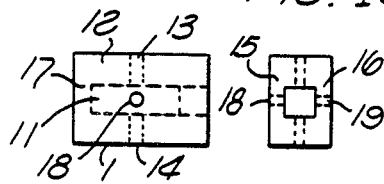
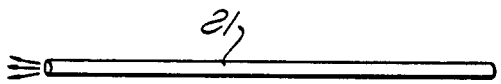
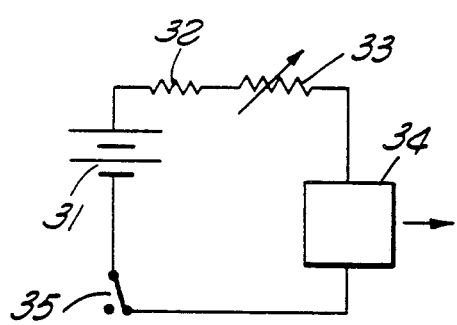
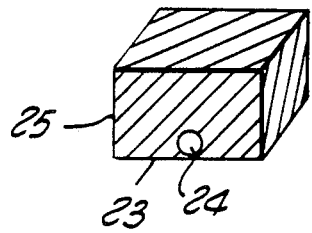
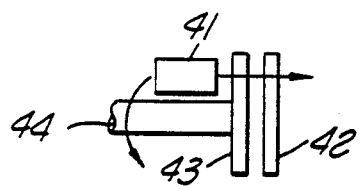
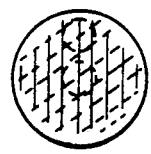

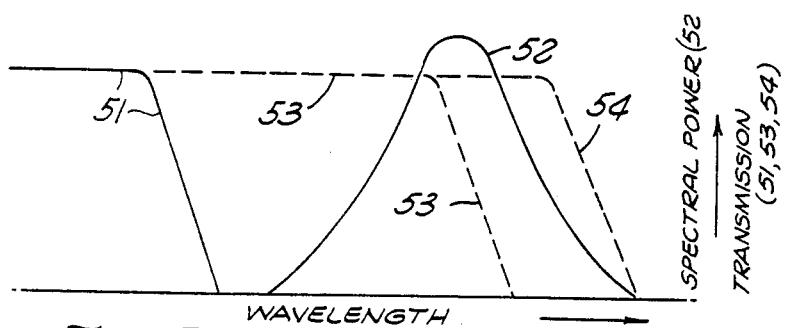
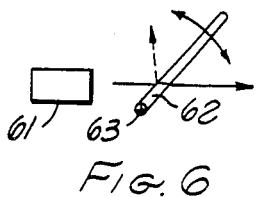
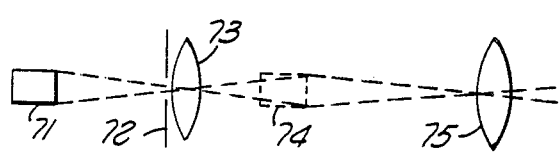
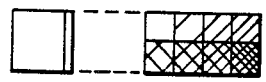
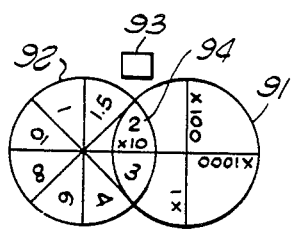
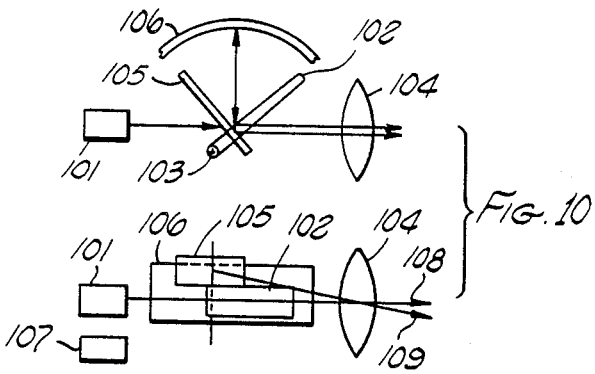
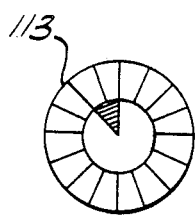
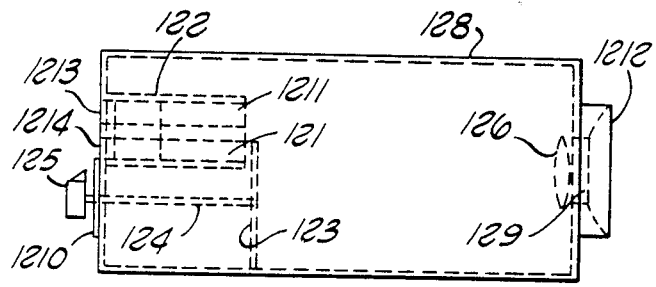
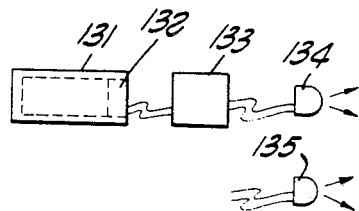

NUCLEAR RADIATION MEASURING APPARATUS AND METHOD

BACKGROUND OF THE INVENTION

The need exists for low cost, rugged, long lived dose rate meters and dosimeters to satisfy military, civil defense, industrial, and individual civilian requirements. The applications include both monitoring for excessive exposure arising from emission of radioactive material by nuclear power and processing plants and monitoring doses and dose rates in order to support critical decisions in a nuclear war environment. Gamma ray measurement is of primary interest, but there also are requirements for measurement of other nuclear radiations.

Dosimeters measure total dose accumulated during the interval between successive readings. Most of the widely used available dosimeters are not user readable; they must be processed at a properly equipped laboratory. This procedure alone is adequate for situations in which the dose rate is unlikely to be high enough to cause excessive exposure during the reading interval, but this condition is unlikely to be satisfied in an emergency. If low dose rates cannot be guaranteed, dose rate measurement also is required. Geiger counters often are used for up to 0.1 or even one Roentgen ® per hour, but ion chambers are the instrument of choice, providing high quality dose rate data at up to approximately 1000 R per hour.

The available dose rate meters are non-ideal for some applications. Geiger counters and ion chambers are electronic devices, typically weighing several pounds and occupying several hundred cubic inches. They are electronic devices, usually with battery life in the range of 50 to 500 hours. Battery shelf life limits may well preclude constructive use of many such instruments in any future emergency. Even the ruggedized versions of these instruments are shock sensitive, and their high cost limits the number likely to be available in an emergency.

Under severe radiation conditions, dosimeters are required in addition to dose rate meters, to guide both continued emergency utilization of personnel and their subsequent medical care. High range dosimeters exist, but most are not user readable.

It is clear that improved dose rate meters are needed and that improved dosimeters also might be useful for radiation protection under emergency conditions.

PRIOR ART

There is some prior art that superficially resembles the current invention. Liebson, U.S. Pat. No. 2,966,589, describes a device containing a scintillating material, a radioluminescent reference light source, and an ocular, all mounted in an opaque case. The reference light source is radioluminescent, and is of a brightness equal to that of the scintillating device when the latter is exposed to a gamma ray field considered to be a limiting safe value. The user of Liebson's instrument looks through the lens into the case, and judges whether the scintillating device is brighter than, as bright as, or dimmer than the reference light source, indicating unsafe, marginal, or safe conditions, respectively.

Liebson's invention is moderately useful, but lacks any quantitative output. Purely qualitative readings are not satisfactory; the radiation dose rate considered to be a maximum acceptable clearly is a function of the circumstances. It may be necessary during a major emergency for personnel to function for a limited time in a higher than desirable dose rate environment. Quantitative knowledge of the dose rate is required to establish an acceptable exposure time.

Greer, in U.S. Pat. No. 3,191,033, also describes a related device. Greer's invention contains a scintillating device, a light absorbing means, and an ocular, all in an opaque case. As with the Liebson instrument or the present invention, the user observes the scintillating device by looking through the lens, which is surrounded by an eyeguard.

Greer's instrument lacks a reference light source. The instrument is operated by advancing the light absorber until substantially no light is seen by the observer. The radiation dose rate then is read by the observer on a suitably calibrated scale coupled to the absorber.

The problems with Greer's invention involve the observer's eye. The degree of dark adaptation determines the reading obtained. The rate of dark adaptation and the ultimately achievable adaptation vary widely among different people and are not even always the same for a single individual. As a result, Greer's instrument is subject to errors which might exceed an order of magnitude.

The present invention enables construction of a dose rate meter which does not have the limitations of either the Liebson or Greer devices as well as a rugged user readable dosimeter.

Additional prior art known to applicant includes U.S. Pat. Nos. 2,652,499; 2,747,132; 2,841,715; 2,913,603; 2,938,121; 3,061,724; 3,239,665; 3,541,311; 3,586,856; 3,728,543; 3,911,283; 4,000,252; and 4,059,765.

SUMMARY OF THE INVENTION

Apparatus and method for measuring nuclear radiation including means sensitive to nuclear radiation and a reference light source and means for adjustment of the light reaching the viewer's eye until the brightness level of the light from the reference source and the radiation sensitive means is substantially the same.

BRIEF DESCRIPTION OF THE DRAWINGS

FIG. 1 is a schematic representation of one form of dose rate meter constructed in accordance with the present invention;

FIGS. 1a–1e are schematic representations of various parts of the dose rate meter illustrated in FIG. 1;

FIG. 2 is a schematic representation of means to enhance scintillator brightness;

FIG. 3 is a circuit diagram for electrical control for brightness matching;

FIG. 4 is a schematic representation of brightness control using polarization;

FIG. 5 is a graph illustrating spectral transmission through various filters;

FIGS. 6 and 7 illustrate alternative embodiments of brightness control means;

FIG. 8 illustrates a form of fixed filter array;

FIG. 9 illustrates a form of readout for a device of the present invention;

FIG. 10 illustrates an alternative embodiment utilizing internal reflective light control for brightness matching;

FIGS. 11 and 12 are schematic representations illustrating internal and external light reference sources; and FIG. 13 illustrates amplification and a secondary source.

DETAILED DESCRIPTION

The invention features the use of brightness matching to enable accurate and rapid visual measurement of nuclear radiation. FIG. 1 illustrates one embodiment of a dose rate meter based on this invention. The major components include a scintillating device 1, a reference light source 2, a brightness matching means 3, and a lens 6, all mounted in an opaque case 8. An aperture 9 in the case 8 and eye guard 7 allow the user to look through the lens 6 and observe and compare the brightness of the scintillating device 1 and reference light source 2.

The scintillating device 1 includes a scintillating material and certain other components to be discussed later. A fraction of the nuclear radiation energy absorbed within the scintillating material is converted to visible light, and a fraction of this light escapes from the scintillating device 1 and travels toward the lens 6. The higher the nuclear radiation dose rate, the more light is emitted by the scintillation device 1. The reference light source 2 also emits light, some portion of which is directed toward the lens 6. The scintillating device 1 and reference light source 2 are optically isolated from each other by the mounting components, so that light from neither can contribute significantly to the apparent brightness of the other.

The user of the dose rate meter looks into the instrument through the lens 6, and in the general case sees that scintillating device 1 and reference light source 2 are not equally bright. The user then adjusts the brightness matching means 3 to equalize approximately the brightness of the scintillating device 1 and the reference light source 2.

In the example shown in FIG. 1, brightness matching is achieved by rotating a device of varying absorption, such as a variable density filter, FIG. 1a, across the light path from the reference light source 2 to the lens 6. It will be obvious to those skilled in the art that the varying absorption device may be translated instead of rotated without departing from the spirit or scope of the invention. Also, in FIG. 1, the brightness matching means 3 includes not only the material interposed in the light beam, but also the shaft 4 on which the brightness matching material is mounted, and the knob 5 used to rotate the shaft 4 and attached brightness matching material.

When the scintillating device 1 and reference light source 2 appear equally bright, or as nearly so as possible if the brightness matching means 3 has discrete steps, the user reads the radiation dose rate on a suitably graduated scale 10 (FIG. 1b) attached to the case 8. In FIG. 1, the scale 10 is located beneath the adjustment knob 5.

The example of FIG. 1, described above, is free from the limitations of the Liebson and Greer instruments. The new instrument is quantitative, and does not require pre-judgement of the appropriate limiting exposure rate, as does the Liebson invention.

The eye can compare brightness of two objects well enough to allow accurate measurement over a wide range of radiation dose rates. The degree of dark adaptation does affect the ability to see the scintillation device and reference light source, but has only moderate effect on the ability of the eye to compare and match the brightness of these two objects when adaptation of the eye is sufficient for them to be visible; accuracy and reproducibility of measurement with the present invention are much superior to those of Greer's instrument.

The present invention can be made very much smaller and lighter than a Geiger counter or ion chamber, and also can be ruggedized to an extreme degree.

Complete description of the invention must include a wide range of variations in the possible details of the several component parts of the invention. Almost all of the possible combinations of the variations in the components will lead to a workable instrument and are considered to be valid examples of the invention.

The scintillation device can use either organic or inorganic scintillation material. The organic class of scintillating materials is very large, including many pure crystalline materials, such as anthracene or napthalene, and mixtures of such materials. The organic class also includes liquid organics, usually produced by dissolving solid organic phosphors in organic solvents such as toluene, and plastic compositions embodying dissolved or otherwise dispersed scintillation materials.

Any of the organic scintillators could be used for the dose rate meter, but the plastic type is most appealing because of its low cost and ease of manufacture. One of the disadvantages of the commercially available plastic scintillators is that they emit at wavelengths significantly shorter than the optimum for human visual detection. However, plastic scintillators can be prepared with a scintillating material or combination of materials that emit in the green, closer to the spectral sensitivity peak of the eye. Alternatively, it is possible to use a commercially available blue emitting plastic scintillator in conjunction with a green emitting fluorescent material. Despite some loss of quantum efficiency, visibility of some combinations may exceed that of the commercial plastic scintillators. The wavelength shifting fluorescent material could be in the form of either a coating applied to the surface of the standard plastic scintillator, or a wafer, depending on the transparency of the wavelength shifter in the wavelength regions of interest.

The inorganic scintillators are more dense than the organics, and absorb more energy per unit volume in a given radiation field. Inorganics also tend to be more efficient in their conversion of the absorbed energy to light. They are available with a range of peak emission wavelengths, and hence visibilities. Inorganics have a minor disadvantage in their high refractive index, but the consequent internal trapping of a significant fraction of the light within the scintillation material can be mitigated by proper surface treatment and the use of appropriate reflective materials. Overall, inorganic phosphors such as cadmium tungstate appear to produce the brightest output and hence to enable manufacture of the most sensitive instrument in a compact package. Alternative inorganics for gamma and X-rays include zinc tungstate and bismuth germanate. Cesium iodide activated by thallium is suitable, but requires some mechanical protection. Lithium iodide activated by europium enables effective neutron dose rate measurement.

A significant advantage of organic scintillator materials for gamma and X-rays lies in the close match of their gamma ray absorption cross section as a function of energy to the corresponding curve for biological tissue. Inorganic scintillators usually contain at least one high atomic number element, and consequently have a disproportionately high cross section for gamma ray absorption at low energy. If the gamma ray energy spectra to be measured were always of the same shape, the mismatch of the crystal response to the tissue dose could be corrected in the calibration of the instrument. This would be true also if the radiation to be measured always could be relied upon to lie in a narrow energy band.

In the more general case, however, the dissimilar cross section curves would cause some error in the measurement with an inorganic scintillator material, in the absence of some type of spectral compensation. The required tissue dose compensation can be provided by the use of a high atomic number material surrounding the inorganic scintillating material. An acceptable compensator might be constructed of a millimeter or two of lead or tungsten, among other choices, with ports to prevent excessive attenuation of the very low energy gamma rays.

Details of the preferred compensator design depend on the range of energy spectra and the geometry of the source of radiation to be monitored, as well as the properties of the crystal and compensator materials. FIG. 1c includes an example of a lead compensator be used with a high atomic number inorganic scintillator crystal 11 used to monitor a broadly dispersed source of broad spectrum gamma radiation. The compensator, with the crystal 11 in place, comprises the scintillation device 1 shown in FIG. 1.

The compensator is open on the viewing end. The top 12 and bottom are each approximately two millimeters thick, and are each penetrated by holes 13 and 14 amounting to approximately ten percent of the corresponding crystal surface area. Note also that the sides 15 and 16 and closed end 17 each are approximately one millimeter thick, and that the sides 15 and 16 are penetrated by holes 18 and 19 amounting to approximately ten percent of the crystal side area.

The above discussion has focused strongly on gamma and X-ray measurements, but the invention can be used to measure other radiations also. For example, the use of a Europium activated lithium iodide crystal surrounded by a suitable moderator, such as plastic, enables measurement of neutron dose rate.

Measurement of less penetrating alpha and beta radiation can be accomplished only if the scintillating material can be reached by said radiation. A tissue dose compensator or even a thick case presents too much absorption. Beta sensitivity easily can be added to an organic scintillator gamma dose rate meter by providing a thin window in the opaque case. The thin window can be covered with an adjustable beta shield to exclude the betas and measure gamma dose rate alone when desired, as is done sometimes with Geiger counters and ionization chambers.

Alpha sensitive dose rate meters also can be produced. The alpha sensitive scintillating material can be much thinner than required for practical gamma sensitivity, and the window in the opaque case must be extremely thin. Either organic or inorganic scintillators can be used. Alpha sensitivity can be added to an organic scintillator device in a gamma dose rate meter in much the same way that beta sensitivity can be provided, but only at the cost of considerable mechanical vulnerability.

Rather than add adjustable beta and alpha windows to the gamma sensitive scintillation device, it is preferable to add small special purpose scintillation devices, each with its own small thin fixed window, in a deep recess in the case, as shown in FIG. 1e. The beta scintillating device 20 relays its light forward via light pipe 26, when beta shield 27 is rotated about pin 28, exposing the thin "window" region of the case next to the beta scintillation device.

For either organic or inorganic scintillation materials, but of special importance for the organics, brightness can be enhanced by careful attention to the details of scintillator size, reflector, and geometry options, as shown in FIG. 2.

In the most obvious example, FIG. 2, a plastic scintillating material could be manufactured in the form of a rather long rod or fiber 21, wound into a coil 22, if desired for use in a compact detector. The plastic element serves as an adequate light pipe, and the light output per unit area at the viewing end may be enhanced by an order of magnitude or more relative to that of a short scintillator.

Either organic or inorganic materials could be manufactured in the form of a cylinder or other shape 23, with dimensions larger than the desired viewing surface 24, and reflected over all except the desired viewing area 24, as depicted in FIG. 2. The light emerging from the aperture 24 in reflector 25 surrounding scintillating material 23 can be many times brighter than may be obtained from an equivalent length cylindrical scintillator of the same diameter as the aperture 24.

Further consideration of the variety of dose rate meter designs reveals that the many possible reference light sources fall into two general classes, electrically powered and radioisotope powered. The readout means also fall into two general classes, external dial types and internal direct reading types. The brightness matching means likewise can be classified generally into two classes, reference light source input power control and observed light control. The reference light source input power control means can be used only with electrically powered reference light sources, and the corresponding readout means generally are restricted to the external dial class. Either class of reference light source power may be used with either class of readout means if the brightness matching means are of the observed light control class.

Radioluminescent reference light sources are attractive, but not essential for the invention. Numerous electrically powered devices can be used as a reference light source, including light emitting diodes, electroluminescent film devices, gas discharge lamps, and incandescent lamps. Incandescent lamps, and possibly some other devices, may require a band pass spectral filter to match the color to that of the scintillation material, to expedite the visual brightness matching process.

The use of any of the electrically powered reference light sources requires incorporation of an electrical power source into the instrument. Because instruments of this type need to be usable in severely disrupted conditions, total dependence on line power is undesirable. Replaceable or rechargeable batteries could be used, as could solar cells or other power sources. Rechargeable batteries could be recharged from line power, photovoltaic cells, or other devices, depending on the details of the application, all of which is well known to those skilled in the art.

Diverse techniques are available for brightness matching. The light from either the scintillating device or the reference light source could be reduced to achieve a brightness match, in principle. Reduction of reference brightness is preferable to reduction of scintillator brightness, to minimize dark adaptation time, reading time, and reading error.

In principle, radioluminescent sources having separable radioisotope and phosphor components could be controlled by adjusting the geometrical relationship between the isotope and the phosphor, or by interposing a variable shield between these components. However, the most practical and economical radioluminescent devices available today are tritium powered. Tritium, hydrogen 3, emits only very low energy beta particles, and the usual tritium activated devices feature tritium gas contained in a small glass tube with an internal phosphor coat. Power input control obviously is not practical for a tritium powered light source, but it would be possible if higher energy radioactive materials were used.

Input power control is practical for electrically powered reference light sources. FIG. 3 shows a battery powered, potentiometer controlled device. Power from battery 31 flows through resistor 32 and potentiometer 33 to reference light source 34 when switch 35 is closed. Switch 35 may not be required if the resistance of Potentiometer 33 is high enough to avoid undue drain on battery 31. In that case, the light source 34 may be turned nearly enough off by adjusting the Potentiometer 33 to maximum resistance. More energy efficient semiconductor control devices also could be used, in lieu of the simple potentiometer.

For any type of reference light source, or for the scintillation device, brightness matching may be achieved by varying the fraction of the emitted light which reaches the viewing optics. Attenuation can be provided by the use of a continuously or discretely variable neutral density filter, as explained earlier in regard to FIG. 1.

Fixed and rotatable polarizing components also could be used, as shown in FIG. 4. Rotation of polarizing piece 43 by means of shaft 44, in conjunction with fixed polarizing element 42, varies the fraction of the light emitted by light source 41 that reaches the ocular (not shown).

Spectral filter brightness matching techniques also are feasible. A discretely variable spectral filter could resemble the neutral density filter of FIG. 1. As the filter 3 is rotated, sectors of successively greater, or lesser, cutoff wavelength are positioned in front of the light source. The function of the filter is best explained with reference to FIG. 5. A sector of transmission depicted in curve 51 transmits none of the light of the spectrum shown in curve 52. A sector of transmission illustrated by curve 53 would transmit the order of half the light, and a sector with transmission curve 54 would transmit the majority of the light. Any desired number of discrete steps can be provided with modern multilayer interference filter techniques.

The neutral density, polarizing, and spectral filter type brightness matching means are described above as rotating mechanisms, but translating analogues to these mechanisms are obvious and are considered part of the invention.

An alternative spectral control means is illustrated in FIG. 6. Interference filter 62 can be rotated about axis 63, which is transverse to the light emitted by light source 61. As filter 62 is turned away from normal to the light, the edge of the transmission curve moves to greater wavelength, altering the fraction of the light transmitted.

A simple glass plate substituted for the spectral filter in FIG. 6 also would provide transmission control. The transmission through the plate 2 varies from a very high value at normal incidence to a much lower value when the glass plate 2 is turned substantially away from normal to the emitted light.

Another approach to brightness matching involves the adjustable aperture of FIG. 7. Adjustment of the aperture 72 adjacent to the internal lens 73 controls the brightness of the image 74 of the light source 71, as seen by the observer through eyelens 75.

Brightness matching also can be achieved by translating the reference light source and making use of the inverse square ratio variation in light intensity at a diffusing screen when the optical path is altered. The brightness of the screen is compared with the brightness of the scintillation device. Variations of this concept include the use of a fixed reference in conjunction with the moving mirror, prism, or lens.

A fixed array of filters of different optical densities, as shown in FIG. 8, could be substituted for the adjustable filter array of FIG. 1, provided that the reference light source is large enough. Alternatively, the windows in the filter plate could be filled with different spectral filters, or glass plates at different angles. The adjustable aperture 72 of FIG. 7 also could be replaced by an array of fixed apertures.

Not all brightness matching techniques can achieve both a broad range of brightness control and adequately fine brightness resolution in a small package. The electrically controlled devices tend to be better in this regard. The optical attenuation type devices, such as those using neutral density filters, often require a combination of coarse and fine brightness matching mechanisms. The limited range problem is particularly true for the fixed array type filters. The combination coarse and fine brightness matching mechanisms could include either the same kind or different kinds of attenuators.

Regardless of the choice of reference light source and brightness matching means, some means of calibration must be provided. With input energy control brightness matching means, calibration can be accomplished at the factory, by proper choice of the fixed resistor 32 in FIG. 3, for example. An alternative is to add a small fixed neutral density filter to the scintillation device. In the special case of the radioluminescent reference, an extra fine incremental filter can be added to the instrument. Equipped with a screwdriver adjustment, it provides both initial calibration and subsequent compensation for decay of the radioactive source.

The unaided eye can measure gamma dose rates from very high levels down to moderately low levels, depending on ambient light level and dark adaptation of the eye. The lower level can be extended down to very low levels by adding electronic amplification, for selected applications. As shown in the block diagram of FIG. 13, light from the scintillation device 131 falls on photodiode 132. The signal from photodiode 132 is amplified by operational amplifier 133, and the amplified signal energizes light emitting diode 134. The observer matches the brightness of diode 134 to that of the reference light source 135, using either the previously discussed brightness matching techniques or control of the amplifier gain.

The amplified system easily can produce individual event pulses bright enough to be counted, at radiation dose rates too low to produce a steady glow of the scintillation device. Under such conditions the observer either counts the pulses in a predetermined time or times the interval required to count a predetermined number of pulses. The dose rate can be related approximately to the count rate, as is done in a Geiger counter. A suitably designed brightness matching instrument also can be operated in a pulse counting mode, providing a very broad total operating range.

In a unit intended to operate only at low dose rates, in the pulse counting mode, the reference light source and brightness matching means can be eliminated. Because only a limited number of counts per second can be distinguished with confidence, it may prove desirable to use two or more scintillating devices of different volumes, and hence, different count rates.

Although it is helpful, light amplification is not essential to this pulse counting mode of operation; proper choice of crystal and careful attention to techniques for light extraction maximize the chance of seeing individual pulses without amplification. An eye that is well adapted to the dark will see unamplified pulses of substantial energy, but will not see pulses below some minimum energy. Pulse counting works better with amplification.

Choice of readout depends in part on the brightness matching means. Input electrical power control brightness matching devices are most logically read on an external scale, as shown in FIG. 1, with the aid of an auxilliary illuminator, if desired. The other brightness matching devices can be read either externally or internally.

FIG. 9 illustrates a direct internal readout technique. It is drawn with a combination of coarse and fine filters, but could be accomplished with a single filter. In the brightness matching process, the observer may proceed as follows:
1. Set fine filter wheel 92 to maximum transmission, reading 10 on the upper line of the illuminated zone of the filters.
2. Set coarse filter 91 so that the illuminated filter zone is darker than the scintillation device 93.
3. Adjust coarse filter 91 until the curvilinear triangle 94 illuminated by the reference light source located behind the filter wheels just appears brighter than the scintillation device 93.
4. Adjust the fine filter 92 until the closest possible match of brightness is achieved between the illuminated zone of filters 91 and 92 and the scintillation device 93.
5. Read the numbers on the overlapped filters; 2×10, as drawn on FIG. 9, means 20 Roentgens per hour.

This type of readout can be used with neutral density or spectral filters, polarized filters, or any other discrete optical attenuation system. For maximum readability with neutral density type filters, the fine filter wheel 192 and the low density, high multiplier, sectors of the coarse wheel 191 should be imprinted with opaque numerals. The high optical density sectors of the coarse wheel 191 should be imprinted with numerals of lower optical density.

Direct internal readout also can be accomplished with the variable angle of incidence partial reflector and interference filter types of brightness matching means, as illustrated in FIG. 10. The light that is not transmitted through the variable angle plate 102 mostly is reflected, at an angle dependent on the angle of incidence. The reflected light falls on an internal scale 106, which is visible to the observer through ocular 104 via auxilliary mirror 105. This technique is more effective with an interference filter than with the plain glass plate. The light reflected from the glass plate is minimal at high dose rate conditions, in which rapid reading is desirable. This difficulty does not occur with reflected light readout in conjunction with with the variable incidence interference filter; a substantial part of the spectrum is nearly fully reflected even when the brightness matching spectral region is nearly fully transmitted.

Direct internal reading also is possible with the variable optical path family of brightness matching devices. Alteration of the optical path length also changes the area of illumination. Transparent numerals may be provided in the aperture plate on which the diffusing screen is mounted. Thus, changing the optical configuration changes the pattern of illumination on the plate and hence changes the reading.

The case can be composed of any suitable construction material, such as metal or plastic. A simple ocular usually will suffice for the viewing system. An eyeguard is desirable, both to protect the eye from injury and to help exclude confusing ambient light.

FIG. 11 illustrates one example of a dosimeter embodiment of this invention. The basic dosimeter element 111 is a type that permanently changes optical transmission in response to the absorbed dose of nuclear radiation. The present invention enables the user to determine the optical transmission, and hence the total dose absorbed by the device at any time, without the use of a special separate dosimeter reader or charger.

The transmission measurement is made by brightness matching. Reference light source 112 illuminates both the dosimeter 111 and the light pipe 1111, after transmission through brightness matching means 113. The output ends of the dosimeter element 111 and light pipe 1111 are visible through aperture 119 in eyeguard 117 and lens 116 after removal of a protective cover (not shown). Construction and surface treatment of the interior of the case 118 are such that light leaking out of the sides of neither the dosimeter element 111 nor the light pipe 1111, and light scattered or reflected by other components, cannot reenter the dosimeter element 111 or light pipe 1111 in quantity sufficient to affect their apparent brightness as viewed through aperture 119 and lens 116.

Brightness matching means 113, in the example of FIG. 11, can consist of a dual annular variable transmission filter disk, mounted on shaft 114 and turned by knob 115. One annulus, the inner as shown in FIG. 11, controls light incident on the dosimeter element 111 and the other controls light incident on the light pipe 1111.

The inner annulus of the filter disk provides a zone of little or no transmission, and a much larger zone of high transmission. The low transmission zone is provided to allow shielding of dosimeter element 111 from unnecessary light if a continuously operating type of reference light source 112 is used, such as a radioluminescent source. If an electrically powered type of reference light source 112 is used and is equipped with a switch, or if the dosimeter element 111 is not significantly sensitive to the low level of illumination from a continuous reference light source, the entire inner annulus provision may be omitted from the brightness matching means.

The outer annulus contains sectors of different transmission, allowing the user to vary the apparant brightness of the light pipe 1111 by rotating the brightness matching means 113 with the aid of knob 115 and shaft 114. When equal or nearly equal brightness of the dosimeter element and light pipe 1111 are observed by the user, he then reads the transmission from a suitably graduated scale 1110 attached to the case. The user then determines total accumulated dose by consultation with a graph or table of dose versus transmission, which may be affixed to the end cap for convenience.

Most of the possible variations in the details of the reference light source and brightness matching means in the dose rate meter embodiment also are possible with the dosimeter embodiment of the invention. A further variation of the dosimeter embodiment can be built with an external reference light source, as shown in FIG. 12. The principal difference between FIGS. 11 and 12 is that in FIG. 12, the reference light source 122 has been replaced by spectrally filtered apertures 1213 and 1214, which are covered by an end cap (not shown in the figure) except when the user is reading the dosimeter. A single filtered aperture also could be used in lieu of apertures 1213 and 1214 to illuminate both the dosimeter element 121 and the light pipe 1211. In that case, the support and light channel element 122 would have to be modified.

The user removes both end caps and points the device toward any convenient source of reflected or emitted light, and matches brightnesses in the same manner as with the internal reference model illustrated in FIG. 11.

This external reference model dosimeter may have the advantages of smaller size, complexity, and cost relative to the internal reference model, but all of the variations are considered part of the invention, as is a combination dose rate meter/dosimeter in a single package.

1. A method for measuring nuclear radiation comprising:
   providing means sensitive to nuclear radiation;
   providing a reference light source;
   while viewing the light from said source and said radiation sensitive means adjusting the light reaching the viewer's eye until the apparent brightness level of light from said source and said radiation sensitive means is substantially the same; and
   after adjusting the apparent brightness ascertaining quantitatively the level of nuclear radiation measured.

2. The method as defined in claim 1 wherein said adjusting includes changing the apparent brightness of the reference source only.

3. The method as defined in claim 2 which further includes moving means having variable light absorption across said reference light source while viewing the same.

4. The method as defined in claim 3 which includes varying the light output of the reference light source while viewing the same.

5. The method as defined in claim 3 which includes varying the size of an aperture through which the light output of the reference source passes.

6. The method as defined in claim 2 which includes reflecting the light from said reference.

7. The method as defined in claim 3 which includes polarizing said light.

8. The method as defined in claim 3 wherein said variable absorption means includes a filter.

9. The method as defined in claim 1, wherein the step of ascertaining the quantitative level of radiation further includes the step of providing a radiation level indication means and observing the indication thereof subsequent to said adjustment.

10. The method as defined in claim 1 wherein said radiation sensitive means permanently changes its optical transmission responsive to said radiation.

11. A method for measuring nuclear radiation comprising:
    providing means sensitive to nuclear radiation for providing visible light responsive to said radiation;
    providing a reference light source;
    while viewing the light emanating from each source thereof adjusting the light reaching the viewer's eye from one of said sources relative to the other until the brightness level of light from each of the sources is substantially the same; and
    after adjusting the apparent brightness ascertaining quantitatively the level of nuclear radiation measured.

12. The method as defined in claim 11 which further includes the step of optically isolating said light sources one from the other to preclude either light source from contributing significantly to the apparent brightness of the other light source.

13. The method as defined in claim 11 wherein said adjusting includes changing the apparent brightness of the reference source only.

14. The method as defined in claim 12 which further includes moving means having variable light absorption across said reference light source while viewing the same.

15. The method as defined in claim 13 which includes varying the light output of the reference light source while viewing the same.

16. The method as defined in claim 13 which includes varying the size of an aperture through which the light output of the reference source passes.

17. The method as defined in claim 13 which includes reflecting the light from said reference.

18. The method as defined in claim 13 which includes polarizing said light.

19. The method as defined in claim 14 wherein said variable absorption means includes a filter.

20. The method as defined in claim 11, wherein the step of ascertaining the quantitative level of radiation further includes the step of providing a radiation level indication means and observing the indication thereof subsequent to said adjustment.

21. The method as defined in claim 11 which further includes providing a tissue dose compensating means to said means sensitive to said nuclear radiation.

22. Apparatus for measuring nuclear radiation comprising:
    housing means which is permeable to nuclear radiation;
    means sensitive to nuclear radiation mounted within said housing;
    a reference light source means mounted within said housing;
    viewing means carried by said housing for enabling a user of said apparatus to simultaneously view light from said reference and said radiation responsive means;
    means disposed within said housing for adjusting the apparent brightness level from said source and said radiation responsive means until the brightness levels appear substantially the same to the user; and
    means for providing a quantitative indication representative of the level of nuclear radiation measured.

23. Apparatus as defined in claim 22 wherein said adjusting means is a variable light absorption member which is moved relative to said one light source.

24. Apparatus as defined in claim 23 wherein said variable light absorption means is a variable density filter.

25. Apparatus as defined in claim 24 which further includes a shaft journaled for rotation and extending through a wall of said housing, said filter being mounted upon said shaft.

26. Apparatus as defined in claim 25 wherein said means for providing a quantitative indication includes indicator means carried by said housing, said indicator means providing a readout proportional to said nuclear radiation when said brightness levels apear substantially the same.

27. Apparatus as defined in claim 23 wherein said adjusting means includes a polarized member.

28. Apparatus as defined in claim 27 which further includes a shaft journaled for rotation and extending through a wall of said housing, said polarized member being mounted upon said shaft, and said one light source is said reference light source.

29. Apparatus as defined in claim 22 wherein said adjusting means includes an adjustable aperture through which said light from said one source passes.

30. Apparatus as defined in claim 22 wherein said adjusting means includes a plate through which said light from said one source passes and means for changing the angle of incidence between said plate and said light from said one source.

31. Apparatus as defined in claim 30 wherein said plate is an interference filter.

32. Apparatus as defined in claim 31 which further includes indicating means mounted internally of said housing to receive light reflected from said interference filter and means enabling the user of said apparatus to view said reflected light.

33. Apparatus as defined in claim 22 wherein said radiation responsive means includes means, the optical transmission of which permanently changes upon exposure to nuclear radiation.

34. The apparatus as defined in claim 33 wherein light from said reference light source passes through said radiation sensitive means during viewing.

35. The apparatus as defined in claim 34 which further includes a light pipe for coupling light from said source to said viewing means.

36. Apparatus for measuring nuclear radiation comprising:
  housing means which is permeable to nuclear radiation;
  means sensitive to nuclear radiation mounted within said housing for providing visible light responsive to said radiation;
  a reference light source means mounted within said housing;
  viewing means carried by said housing for enabling a user of said apparatus to simultaneously view light emanating from said reference and said radiation responsive means;
  means disposed between said viewing means and said sources of light for adjusting the brightness level from one of said sources relative to the other until a brightness level of light from each of said sources appears substantially the same to the user; and
  means for providing a quantitative indication representative of the level of nuclear radiation measured.

37. Apparatus as defined in claim 36 wherein said adjusting means is a variable light absorption member which is moved relative to said one light source.

38. Apparatus as defined in claim 37 wherein said variable light absorption means is a variable density filter.

39. Apparatus as defined in claim 38 which further includes a shaft journaled for rotation and extending through a wall of said housing, said filter being mounted upon said shaft, and said one light source is said reference light source.

40. Apparatus as defined in claim 39 wherein said means for providing a quantitative indication includes indicator means mounted externally of said housing and adjacent said shaft, said indicator means providing a readout proportional to said nuclear radiation when said brightness levels of said light sources are substantially the same.

41. Apparatus as defined in claim 36 wherein said adjusting means includes a polarized member.

42. Apparatus as defined in claim 41 which further includes a shaft journaled for rotation and extending through a wall of said housing, said polarized member being mounted upon said shaft, and said one light source is said reference light source.

43. Apparatus as defined in claim 42 which further includes a shaft journaled for rotation and extending through a wall of said housing, said member being mounted upon said shaft, and said one light source is said reference light source.

44. Apparatus as defined in claim 36 wherein said adjusting means includes an adjustable aperture through which said light from said one source passes.

45. Apparatus as defined in claim 36 wherein said adjusting means includes a plate through which said light from said one source passes and means for changing the angle of incidence between said plate and said light from said one source.

46. Apparatus as defined in claim 45 wherein said plate is an interference filter.

47. Apparatus as defined in claim 46 which further includes indicating means mounted internally of said housing to receive light reflected from said interference filter and means enabling the user of said apparatus to view said reflected light.

48. Apparatus as defined in claim 36 which further includes indicator means carried by said housing, said indicator means providing a readout proportional to said nuclear radiation when said brightness levels are substantially the same.

49. Apparatus as defined in claim 48 wherein said indicator means is disposed internally of said housing.

50. Apparatus as defined in claim 48 wherein said indicator means is disposed externally of said housing.

51. Apparatus as defined in claim 36 which further includes tissue dose compensating means.

* * * * *